United States Patent

[11] 3,625,956

[72] Inventor Enos C. Pesterfield, Jr.
 Briarcliff Manor, N.Y.
[21] Appl. No. 689,006
[22] Filed Dec. 8, 1967
[45] Patented Dec. 7, 1971
[73] Assignee Ciba-Geigy Corporation

[54] 1-PHENYL-4-ALKYL-2-IMIDAZOLONE DERIVATIVES
 6 Claims, No Drawings
[52] U.S. Cl..................................................... 260/309.6,
 260/553 A, 424/273
[51] Int. Cl........................................................ C07d 49/34
[50] Field of Search............................................ 260/309.6

[56] References Cited
 UNITED STATES PATENTS
3,303,199 2/1967 Doebel et al.................. 260/309.6

OTHER REFERENCES
Fritsch Ber. Deut. Chem. Vol. 26, pages 427– 8 (1893) QD1.D4

Primary Examiner—Natalie Trousof
Attorneys—Karl F. Jorda, Bruce M. Collins and Martin J. Spellman, Jr.

ABSTRACT: 2-Imidazolones having a phenyl or substituted phenyl group in the 1-position and a lower alkyl group in the 4-position, such as 1-phenyl-, 1-(4-trifluoromethyl-phenyl)-, 1-(4-methoxyphenyl)-, 1-(fluorophenyl)-, and 1-(4-chlorophenyl)-4-methyl-2-imidazolones, are anti-inflammatory agents having analgesic and antipyretic properties and can be prepared by acid catalyzed cyclization of the urea derived from a phenyl or substituted phenyl isocyanate and an acetal of an α-aminoalkylaldehyde.

1-PHENYL-4-ALKYL-2-IMIDAZOLONE DERIVATIVES

DETAILED DESCRIPTION

The present invention pertains to 2-imidazolones which are substituted in the 1-position by a phenyl or substituted phenyl group and in the 4-position by a lower alkyl group, as well as to intermediates for the preparation of such compounds, and to methods and compositions for the use of such compound.

In particular, this invention relates to compounds of the formula:

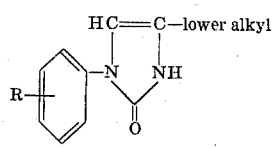

wherein R is hydrogen, fluoro, chloro, bromo, trifluoromethyl, lower alkyl, lower alkylthio, lower alkoxy, hydroxy or lower alkanoyloxy.

In the foregoing and following description and in the appended claims, the term "lower alkyl," as well as similar derivations of the term "lower alkane," denotes a straight or branched hydrocarbon group of from one to six carbon atoms: e.g., methyl, ethyl, propyl, isopropyl, butyl, pentyl, hexyl and the like. "Lower alkoxy" thus denotes a lower alkyl group bound to the remainder of the molecule through an oxygen ether linkage while "lower alkylthio" denotes the analogous functional group having a thioether linkage. "Lower alkanoyloxy" denotes the acyloxy residue of an alkanoic acid having from two to seven carbon atoms.

The 2-imidazolones of the present invention are anti-inflammatory agents and are accordingly useful for the treatment of a variety of inflammatory conditions such as dermatitis, inflammation of joints and similar conditions which are usually responsive to known anti-inflammatory agents. Advantageously these compounds also possess antipyretic and analgesic properties and are thus particularly useful in the treatment of inflammatory conditions in which an increase in body temperature and pain or excessive discomfort are also present. The compounds appear to be well tolerated and do not appear to cause undesirable side effects such as allergic reactions.

These 2-imidazolones are employed through utilization of the standard and art recognized modes of administration. Thus they are administered orally via capsules, tablets, solutions or suspensions or the like, parenterally via solutions or suspensions suitable for injection, or topically via creams, ointments, solutions, suspensions or the like. Such pharmaceutical formulations are compounded in accordance with the usual and accepted methods of good pharmaceutical practice.

The anti-inflammatory, antipyretic and analgesic properties of these compounds can be conveniently observed in standard and accepted tests, which are recognized by pharmacologists as correlating to a specific therapeutic response. For example, anti-inflammatory activity can be observed in the anticarrageenin study, which is generally performed in the rat, in the ultraviolet erythema antagonism test, which is generally performed in the guinea pig and in the adjuvant arthritis test, also performed in the rat. Analgesic activity can be observed for example through use of the hotbox test or the acetic acid stretch test, both of which employ mice as the test animal. Antipyretic activity can be observed in the yeast pyrexia depression assay, generally performed in the rat. The anti-inflammatory, analgesic and antipyretic activities of these compounds are all observed in a dosage range of from about 25 mg./kg. to about 500 mg./kg. of body weight; e.g., from about 100 to about 250 mg./kg., the precise dosage depending upon the nature, age and size of the species and particular indication involved.

It is to be appreciated that the foregoing description of how to use the compounds of the present invention is directed at those skilled in the arts of chemistry and pharmacology and should not be construed as a recommendation or encouragement to employ these compounds in humans, either for therapy or experimentation, without compliance with all rules and regulations promulgated under appropriate federal statutes, particularly Title 21 of the United States Code, and such state requirements as may be applicable. Moreover and in accordance with accepted scientific practice, any such use should not be undertaken without proper professional supervision and without careful study of all subsequently available information concerning the pharmacological properties of these compounds, whether such information becomes available through the requirements and facilities of federal or state authorities, through scientific publications, or otherwise.

The 2-imidazolones of the present invention can be prepared via the acid-catalyzed cyclization of a urea of formula II

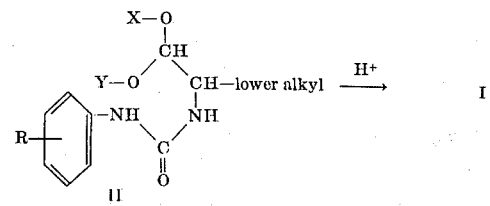

wherein R is as defined above and X and Y taken separately are each a like lower alkyl group or taken collectively are lower alkylene. The reaction proceeds rapidly and can be conveniently performed in situ upon formation of the urea starting material. Thus for example, the urea of formula II can be obtained via condensation of phenylisocyanate or a substituted phenylisocyanate of formula III and an acetal of an α-aminoalkylaldehyde of formula IV.

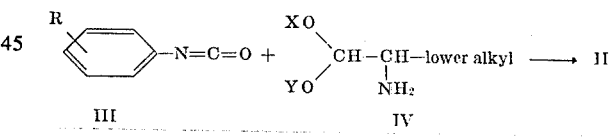

This condensation is readily accomplished through simple admixture of the two reagents, optionally in an inert solvent such as benzene, under nonaqueous conditions. Mild heating; e.g., refluxing, after the initial reaction period, generally improves yields. Upon completion of this condensation and removal of any solvent, as through evaporation, the resulting urea can be cyclized simply by adding an acid catalyst such as sulfuric acid and gently heating. The product forms directly and can be purified via conventional methods such as crystallization, chromatography, sublimation or the like.

In the case of those compounds wherein R is hydroxy, it is advantageous to employ intermediates wherein the hydroxy group is protected, as for example through acylation. The final 1-(hydroxyphenyl)-4-lower alkyl-2-imidazolones are then obtained through mild saponification of the corresponding 1-(a-cyloxyphenyl)-4-lower alkyl-2-imidazolone, obtained upon cyclization of such acylated intermediates.

Of the above compounds of formula I, a particularly preferred subclass are those of the formula:

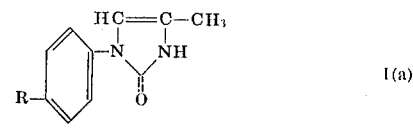

wherein R is as defined above, especially those compounds of formula I(a) wherein R is hydrogen, fluoro, chloro, trifluoromethyl or methoxy.

The following examples will further serve to typify the nature of the present invention but should not be construed as a limitation thereof.

EXAMPLE 1

1-(4-methoxyphenyl)-4-methyl-2-imidazolone.

A solution of 5.0 g. of 4-methoxyphenylisocyanate in 25 ml. of dry benzene is added over a 5-minute period at room temperature to a stirred solution of 5.7 g. of the diethyl acetal of α-aminopropionaldehyde. The reaction mixture is stirred at room temperature for 1 hour and then refluxed for 1 hour. The cooled solution is concentrated under reduced pressure and to the residual syrup is added 30 ml. of 25 percent aqueous sulfuric acid. This mixture is heated at steam bath temperatures under solid forms. This solid is collected, washed well with water and vacuum dried to yield the product which may be further purified through crystallization from ethanol and sublimation.

In a similar fashion from 2-methylphenylisocyanate there is obtained 1-(2-methoxyphenyl)-4-methyl-2-imidazolone.

EXAMPLE 2

1-Phenyl-4-methyl-2-imidazolone

A solution of 5.0 g. of phenylisocyanate in 25 ml. of dry benzene is added over a 5-minute period at room temperature to a stirred solution of 6.3 g. of the diethyl acetal of α-aminopropionaldehyde. Stirring is continued at room temperature for 1 hour, after which the mixture is refluxed for 1 hour. The cooled solution is concentrated under reduced pressure. To the residue is added 30 ml. of 25 percent aqueous sulfuric acid and this mixture is heated at steam bath temperatures. The solid which forms is collected, washed well with water and vacuum dried to yield the product which may be further purified through crystallization from ethanol.

EXAMPLE 3

1-(4-Fluorophenyl)-4-methyl-2-imidazolone

To a stirred solution of 5.0 g. of the diethyl acetal of α-aminopropionaldehyde is added over a 5-minute period at room temperature a solution of 5.0 g. of 4-fluorophenylisocyanate in 25 ml. of dry benzene. After being stirred at room temperature for 1 hour, refluxed for 1 hour and cooled, the solution is concentrated under reduced pressure. To the residue is added 30 ml. of 25 percent aqueous sulfuric acid and this mixture is heated at steam bath temperatures. The solid which forms is collected by filtration, washed well with water and dried under vacuum. The product may be further purified through crystallization from ethanol.

Substitution of 3-fluoroisocyanate for 4-fluoroisocyanate in the above procedure yields 1-(3-fluorophenyl)-4-methyl-2-imidazolone.

Similarly by substituting 5.2 g. of each of 4-chlorophenylisocyanate and 3-chlorophenylisocyanate for 4-fluorophenylisocyanate, there are respectively obtained upon execution of the above procedure, 1-(4-chlorophenyl)-4-methyl-2-imidazolone and 1-(3-chlorophenyl)-4-methyl-2-imidazolone.

EXAMPLE 4

1-(4-trifluoromethylphenyl)-4-methyl-2-imidazolone

A solution of 5.0 g. of 4-trifluorophenylisocyanate in 25 ml. of dry benzene is added over a 5-minute period at room temperature to a stirred solution of 3.9 g. of α-aminopropionaldehyde diethyl acetal. The reaction mixture is stirred at room temperature for 1 hour, refluxed for 1 hour, cooled and concentrated under reduced pressure. To the residue is added 30 ml. of 25 percent aqueous sulfuric acid. This mixture is heated at steam bath temperatures under a solid form. This solid is collected by filtration, washed well with water and vacuum dried to yield 1-(4-trifluoromethylphenyl)-4-methyl-2-imidazolone which may be further purified through crystallization from ethanol.

3-Trifluoromethylphenylisocyanate, when substituted for 4-trifluoromethylphenylisocyanate in the above procedure, yields 1-(3-trifluorophenyl)-4-methyl-2-imidazolone.

EXAMPLE 5

1-(2(Acetoxyphenyl)-4-ethyl-2-imidazolone

A solution of 5.0 g. of 2-acetoxyphenylisocyanate in 25 ml. of dry benzene is added over a 5-minute period at room temperature to a stirred solution of 5.0 g. of 1,1-diethoxy-2-aminobutane in 25 ml. of dry benzene. After stirring for 1 hour at room temperature, the reaction mixture is heated at reflux for an additional 1 hour. The cooled reaction mixture is concentrated under reduced pressure and the residue is treated with 30 ml. of 25 percent sulfuric acid at steam bath temperature. The solid which forms is collected by filtration, washed well with water and is vacuum dried to yield 1-(2-acetoxyphenyl)-4-ethyl-2-imidazolone, which may be further purified through recrystallization from ethanol.

EXAMPLE 6

1-(2-Hydroxyphenyl)-4-ethyl-2-imidazolone

A mixture of 4.0 g. of 1-(2-acetoxyphenyl)-4-ethyl-2-imidazolone and 50 ml. of 20 percent aqueous potassium carbonate is heated in a nitrogen atmosphere on the steam bath for 2 hours. The cooled reaction mixture is treated with decolorizing charcoal and filtered. The filtrate is carefully acidified with hydrochloric acid and the solid which forms is collected and washed well with water to yield 1-(2-hydroxyphenyl)-4-ethyl-2-imidazolone which may be further purified through crystallization from aqueous ethanol.

EXAMPLE 7

1-(4-Methylthiophenyl)-4-methyl-2imidazolone

A mixture of 20 g. of 4-methylthioaniline, 165 ml. of a 12 percent solution of phosgene in toluene, 15 g. of potassium carbonate, and 500 ml. of dry toluene is heated at reflux for 24 hours. The cooled reaction mixture is filtered and the filtrate is concentrated by distillation. The residue is distilled in vacuo to yield 4-methylthiophenylisocyanate as a yellow oil.

To 5.0 g. of the diethylacetal of α-aminopropionaldehyde is added with stirring over a 5-minute period at room temperature, a solution of 5.6 g. of 4-methylthiophenylisocyanate. The mixture is stirred at room temperature for 1 hour, heated at reflux for 1 hour, cooled and concentrated under reduced pressure. After adding 30 ml. of 25 percent aqueous sulfuric acid, the mixture is heated for an additional hour at steam bath temperatures. The solid which forms is collected by filtration, washed with water and dried to yield the product which may be further purified through recrystallization from ethanol.

In an analogous fashion to that described in any of examples 1-4 or 7, 1-(4-methylphenyl)-4-methyl-2-imidazolone, 1-(4-bromophenyl)-4-mehtyl-2-imidazolone, 1-(2-fluorophenyl)-4-methyl-2-imidazolone, 1-(2-methylphenyl)-4-methyl-2-imidazolone, 1-(2-chlorophenyl)-4-methyl-2-imidazolone, 1-(3-methylphenyl)-4-methyl-2-imidazolone and 1-(3-bromophenyl-4-methyl-2-imidazolone are prepared through utilization of equivalent amounts of 4-methylphenylisocyanate, 4-bromophenylisocyanate, 2-fluorophenylisocyanate, 2-methyl-phenylisocyanate, 2-chlorophenylisocyanate, 3-methylphenylisocyanate and 3-bromophenylisocyanate. Likewise substitution of other 1,1-dialkoxy-2-aminoalkanes wherein the alkane chain has from three to eight carbon atoms results in the formation of 4-alkylimidazolones wherein the alkyl group in the 4-position has from one to six carbon atoms.

Typical of the properties of these compounds, 1-(4-methoxyphenyl)-4-methyl-2-imidazolone, at an oral dose of 100 mg./kg. produces up to a 30 percent reduction in swelling in the hind paw of a rat which has been previously injected with 0.1 ml. of 1 percent carrageenin. At a similar dose the compound exhibits an increase in the pain threshold in the mouse equal to that of morphine in the hotbox test. Duplicate oral doses of 100 mg. to the guinea pig produces over 30 percent protection to the development of erythema caused by exposure to ultraviolet light. A single oral dose of 100 mg./kg. also causes over 3° F. drop in body temperature (measured rectally) over a 3-hour period in rats treated 18 hours earlier with a 15 percent yeast solution given subcutaneously. The other compounds described herein produce similar responses.

EXAMPLE 8

| Ingredient | Quantity/capsule |
| --- | --- |
| 1-(4-methoxyphenyl)-4-methyl-2-imidazolone | 100 mg. |
| Cornstarch U.S.P. | 200 mg. |

The foregoing ingredients are mixed and introduced into a two-piece No. 1 hard gelatin capsule.

EXAMPLE 9

| Ingredient | Quantity/tablet |
| --- | --- |
| 1-(4-Fluorophenyl)-4-methyl-2-imidazolone | 50 mg. |
| Cornstarch U.S.P. | 130 mg. |
| Lactose | 160 mg. |
| Cab-O-Sil M-5 | 4 mg. |
| Gelatin U.S.P. | 5 mg. |
| Magnesium Stearate U.S.P. | 1 mg. |

The foregoing ingredients are thoroughly mixed and pressed into tablets suitable for oral administration of 50 mg. of active ingredient. The tablets may be scored to permit administration of fractional doses.

What is claimed is:

1. A compound of the formula:

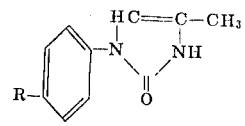

wherein R is o-fluoro, p-trifluoromethyl, p-methyl, or p-methoxy.

2. A compound according to claim 1 wherein said lower alkyl is methyl.

3. The compound according to claim 1 wherein said compound is 1-(4-methoxyphenyl)-4-methyl-2-imidazolone.

4. The compound according to claim 1 wherein said compound is 1-(4-trifluoromethylphenyl)-4-methyl-2-imidazolone.

5. The compound according to claim 1 wherein said compound is 1-(4-methylphenyl)-4-methyl-2-imidazolone.

6. The compound according to claim 1 wherein said compound is 1-(2-fluorophenyl)-4-methyl-2-imidazolone.

* * * * *